(12) United States Patent
Mikkola et al.

(10) Patent No.: US 7,814,772 B2
(45) Date of Patent: Oct. 19, 2010

(54) METHOD FOR MANUFACTURING A COILER DRUM AND A COILER DRUM

(75) Inventors: Osmo Mikkola, Tampere (FI); Timo Norvasto, Tampere (FI); Pirjo Virtanen, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 329 days.

(21) Appl. No.: 11/987,348

(22) Filed: Nov. 29, 2007

(65) Prior Publication Data

US 2009/0139291 A1 Jun. 4, 2009

(51) Int. Cl.
 *B21C 47/00* (2006.01)
 *B65H 75/14* (2006.01)
(52) U.S. Cl. .............................. 72/148; 72/47; 242/600; 242/610.5; 492/30
(58) Field of Classification Search ............... 72/46, 72/47, 148, 462, 476; 242/600, 613, 610, 242/610.4, 610.5; 492/28, 30
See application file for complete search history.

(56) References Cited

U.S. PATENT DOCUMENTS

| 4,867,116 | A | | 9/1989 | de Freitas Couto Rosa et al. |
| 5,167,732 | A | * | 12/1992 | Naik ........................... 148/404 |
| 5,420,395 | A | * | 5/1995 | Hyllberg et al. .............. 219/470 |
| 5,609,922 | A | * | 3/1997 | McDonald .................... 427/447 |
| 5,879,132 | A | * | 3/1999 | Usami et al. ............. 416/223 R |
| 6,033,626 | A | | 3/2000 | Takahashi |
| 6,403,165 | B1 | * | 6/2002 | Grylls et al. ................. 427/456 |
| 6,548,125 | B2 | * | 4/2003 | Warnecke .................... 427/597 |
| 7,237,414 | B2 | * | 7/2007 | Acquaviva et al. ............ 72/148 |
| 2001/0013383 | A1 | | 8/2001 | Takahashi et al. |

FOREIGN PATENT DOCUMENTS

| DE | 19857737 A1 | | 5/2000 |
| DE | 10343419 | * | 4/2005 |
| JP | 58138517 | | 8/1983 |
| JP | 2001220636 | | 8/2001 |
| JP | 2002-302725 | * | 10/2002 |

OTHER PUBLICATIONS

International Search Report, dated Mar. 24, 2009, issued in counterpart International Application No. PCT/FI2008/050668.

* cited by examiner

*Primary Examiner*—Edward Tolan
(74) *Attorney, Agent, or Firm*—Venable LLP; Eric J. Franklin

(57) ABSTRACT

A method for manufacturing a coiler drum to be used in a coiler furnace and a coiler drum. The method comprises the step of forming a trinickel aluminide containing surface layer onto a coiler drum body.

34 Claims, 3 Drawing Sheets

A - A

METHOD FOR MANUFACTURING A COILER DRUM AND A COILER DRUM

FIELD OF THE INVENTION

The invention relates to a method for manufacturing a coiler drum and to a coiler drum.

BACKGROUND OF THE INVENTION

Reversing hot mills, also called Steckel mills, are used as hot strip mills for hot-rolling slabs of stainless steels, special steel, etc.

FIG. 1 shows schematically a reversing rolling mill 1 having a relatively high temperature where a cast slab of steel is passed through rolls 2a and 2b several times. The rolls 2a and 2b are in nip contact with each other and when the slab travels trough the nip N, the thickness of the slab is reduced to a strip 3 having a thinner thickness.

On opposite sides of the rolling mill 1 there are arranged two coiler furnaces 4. When processing the strip with the rolling mill 1, it is alternately wound up on and unwound from the opposed coiler furnaces 4, each comprising a rotating, cylindrical coiler drum 5. The purpose of the coiler furnaces is to maintain the temperature of the strip between passes through the nip N. The coiler furnaces are maintained at a temperature, for example, of about 900 to about 1050° C.

In operation, the strip 3 passing through the nip N is led to the nearer coiler furnace 4 and wound onto its respective coiler drum 5. Subsequently, the strip 3 is unwound from the coiler drum 5 as the strip is fed back through the nip N. The process passing the strip through the nip N and winding and unwinding it is repeated until a desired thickness of the strip is reached.

A coiler drum is a hollow cylinder having an outside diameter of at least about 1000 mm, a length of about 2000 to 5000 mm and a great wall thickness of about 30 to 150 mm. The coiler drum is usually prepared by casting of a heat resistant alloy. The working surface of a coiler drum, that is the surface that becomes next to the strip to be wound, is usually flat or grooved.

As can be realized from the description above, the coiler drum is working in a very harsh environment. The temperature in the coiler furnace is high. The surface of the coiler drum is also repeatedly subjected to high tightening force when winding the steel strip on the drum. This causes fatigue fractures or other cracks to the surface of the coiler drum. The coiler drums also blister. These influence the durability of the coiler drum. They also leave marks on the steel strip that is being manufactured, thus deteriorating the quality of the product. The surface of the coiler drum is also exposed to an iron oxide film formed on the surface of the steel strip when rolling up the steel strip. In spite of descaling, part of the iron oxide film transfers on and sticks to the coiler drum and subsequently causes defects to the strip. This deteriorates the quality of the product.

Nowadays the problems caused by the blisters in the coiler drum surface are solved by shutting down the furnace so that the blisters can be hand-ground to reduce the blisters. The frequent shut downs result in high operating costs for maintaining the rolls and reduction of product throughput capability.

The coiler drums also tend to sag at current operating temperatures, which prevents operating the furnace at even higher temperatures. The sagging causes the drums to become eccentric in their rotation. This causes uneven revolving of the drum, which has an influence on the operation and durability of the coiler furnace and causes defects on the strip. Sagging also causes deformations, i.e. narrowing the slot of the coiler drum. As a consequence, the coiler drum has to be replaced.

The above mentioned problems have been tried to overcome by using different cast steel compositions when casting the coiler drums. One example is disclosed in U.S. Pat. No. 6,033,626. The composition presented in the patent is only a variation of a standard steel composition. It is soft in high temperatures in which the coiler drums are being used and thus there are problems caused by the deformation of the coiler drum. Also it can not refrain the blistering of the surface of the coiler drum.

US published patent application 2001/0013383 discloses a trinickel aluminide-based heat resistant alloy for a material for hearth rolls for heating furnaces. The material has a high creep rupture strength in temperature ranges over 1050° C. and excellent weldability. The problem is that trinickel aluminide-based materials are expensive. The material is suitable for casting rolls with a simple structure, i.e. a hollow cylinder, but it can not be used to cast objects with complex geometrical structures, such as a coiler drum. Moreover, when preparing the molten trinickel aluminide alloy, the reaction is strongly exothermical. Thus it is not possible to cast objects that are as big in size as coiler drums are.

Both of these patent publications disclose casting the entire drum or roll from the same material and as one piece.

BRIEF DESCRIPTION OF THE INVENTION

The purpose of the present invention is thus to provide a method for manufacturing a coiler drum and a coiler drum, which method and coiler drum avoid the above-mentioned problems and by means of which the durability of the coiler drum can be increased remarkably and the quality of the product produced by a rolling mill can be improved.

The invention is based on the idea that the coiler drum is manufactured in such a way that it comprises forming a trinickel aluminide containing surface layer on a coiler drum body.

The trinickel aluminide alloy can be formed on the coiler drum body by welding or thermal spraying. The surface layer may also be a sleeve of trinickel aluminide alloy that is arranged on the body. The thickness of the surface layer is from about 0,1 mm to about 8 mm, suitably from about 1 mm to about 4 mm. The surface layer defines a working surface that will engage a strip of metal when it is being rolled on the coiler drum.

The surface layer may be produced to be smooth and even against the steel strip to be wound. The surface layer can be formed on the coiler drum as raised strips of trinickel aluminide alloy extending radially outward from the base surface of the coiler drum body. These raised strips define a working surface that will engage a strip of metal when it is being rolled on the coiler drum.

The invention has many advantages. Trinickel aluminide alloy has high temperature strength and high temperature corrosion resistance. Consequently, when the surface layer is made from trinickel aluminide alloy, the surface hardness is excellent in high temperatures. When using a conventional H-series austenitic alloy as the surface material, the surface hardness decreases as the temperature increases. It has been noticed that the high surface hardness of trinickel aluminide alloy lasts through the lifetime of a coiler drum in high temperatures. It has also been noticed that the sticking of the iron oxide from the product to the coiler drums is reduced or eliminated, which reduces the pitting marks on the strips.

Thus, the quality of the end product is better and the yield from slab to the product is higher. The working life of the coiler drum is also increased because of the high durability in high temperatures. The deformations of the drum are reduced which also increases its lifetime.

It is also possible to manufacture the coiler drum body from a lower cost material and use the expensive trinickel aluminide material only for forming the surface layer. This reduces the price of the coiler drum. Also by using a material having a high yield strength in the drum body and a trinickel aluminide-based surface layer on it, it is possible to improve the drum's strength against local stresses and to prevent drum breakages and deformation.

When using a structure where the surface layer is welded on the coiler drum body, it has been noticed in high temperature FEA analysis that the welded surface structure reduces the temperature gradient in coiler drum wall. This results in lower combined stresses and prevents the drum breakage and deformation.

BRIEF DESCRIPTION OF THE DRAWINGS

In the following, the present invention will be described in more detail with reference to the appended figures, in which.

DETAILED DESCRIPTION OF THE INVENTION

In this description and claims the term casting means pouring a molten steel alloy to a casting mould where it is solidified as it is cools down. The molten alloy retains the form defined by the casting mould when it cools down. The casting mould can be either stationary or it can rotate in the axial direction during casting. Rotating casting moulds are used to cast axially symmetrical objects, such as cylinders, rolls or pipes.

Figure 1:
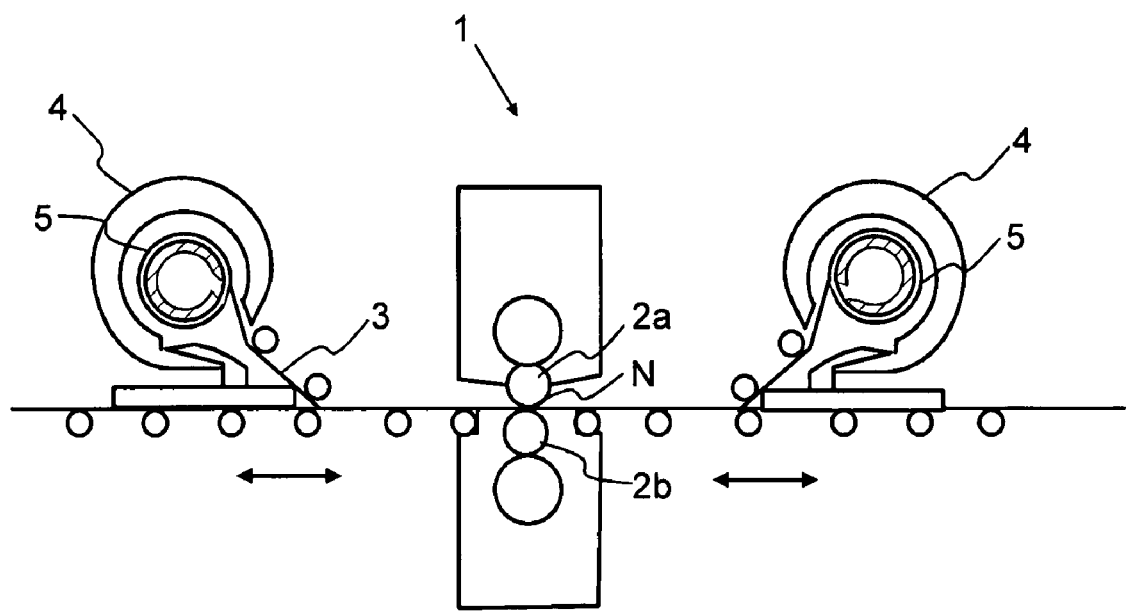
FIG. 1 shows schematically a conventional reversing rolling mill in a side view.

FIG. 1 has been explained above, and thus it will not be discussed here any more.

Figure 2:
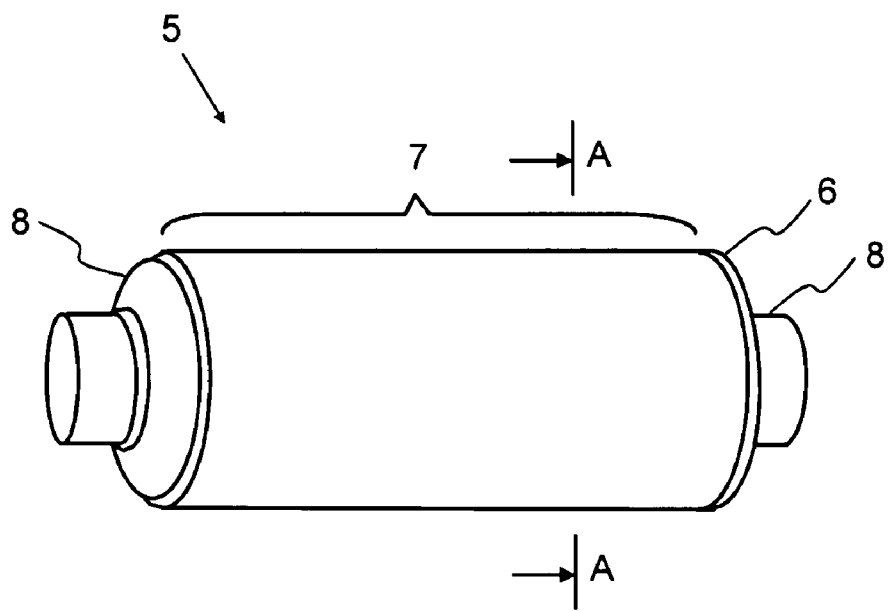
FIG. 2 shows a perspective view of a coiler drum.

FIG. 2 shows a coiler drum 5 that has been manufactured according to the method of the invention. The coiler drum comprises a coiler drum body 6 that has a surface layer 7 on it. The coiler drum body 6 can be seen in FIG. 3. The coiler drum body is formed by casting. As a cast steel can be used a standard H-series stainless steel, e.g. ASTM A297 grade HK, HT, HP steel or other heat resistant alloy. The body is formed as a circular body with a wall thickness of about 30 mm to about 150 mm. The body is therefore hollow inside. On the body, a slot 12 is provided for grabbing the end of the strip 3 when starting the rolling of the strip 'on the' coiler drum 5. The length of the body can vary and it is determined by the size of the coiler furnace. Trunnions 8 are formed to each end of the coiler drum body 6. By the trunnions the coiler drum is attached to the coiler furnace.

Figure 3:
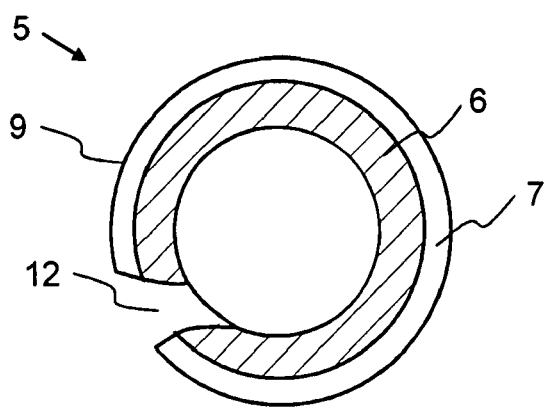
FIG. 3 shows the cross section A-A of the coiler drum presented in FIG. 1.

In one embodiment of the invention, a surface layer 7 of trinickel aluminide ($Ni_3Al$) alloy is provided on the coiler drum body 6. The surface layer covers the coiler drum substantially completely, extending, in the axial direction of the coiler drum, from one end of the coiler drum to the other end and defining a working surface 9 that will engage the strip of metal when it is being processed in a reversing rolling mill. It also covers the coiler drum body around its entire circumference. In FIG. 3 can be seen the cross section A-A of the coiler drum presented in FIG. 1. The surface layer may be formed to the coiler drum body by overlay welding. In other words, the surface layer is formed by superimposing several layers of trinickel aluminide alloy on the coiler drum body. The welding may be done by plasma, laser, MIG/MAG or TIG welding. In welding, a filler metal comprising trinickel aluminide is used. The number of overlays is determined by the desired thickness of the surface layer. The surface layer may also be formed on the coiler drum body by thermal spraying. Thermal spraying is conducted by melting the trinickel aluminide alloy into droplets and impinging these droplets on the coiler drum. Different welding techniques and thermal spraying are well known to the skilled person in the art and thus they will not be described here in more detail. The surface layer is finished to have a smooth working surface by heat treating and machining and/or grinding the drum after the surface layer is formed on the drum body.

The surface layer can also be a sleeve of trinickel aluminide alloy that is arranged on the body. The sleeve may be prepared from a sheet of trinickel aluminide alloy having a suitable thickness. The sheet is processed to a sleeve of appropriate size and it is fitted on the drum body. The sleeve is attached to the coiler drum body by welding.

FIGS. 2 and 3 show a coiler drum comprising a surface layer of trinickel aluminide alloy defining a smooth working surface 9 that will engage the strip of metal when it is being processed in a reversing rolling mill.

In another embodiment of the invention, the coiler drum 5 comprises a plurality of raised strips of trinickel aluminide alloy extending radially outward from the base surface of the coiler drum body.

Figure 4:
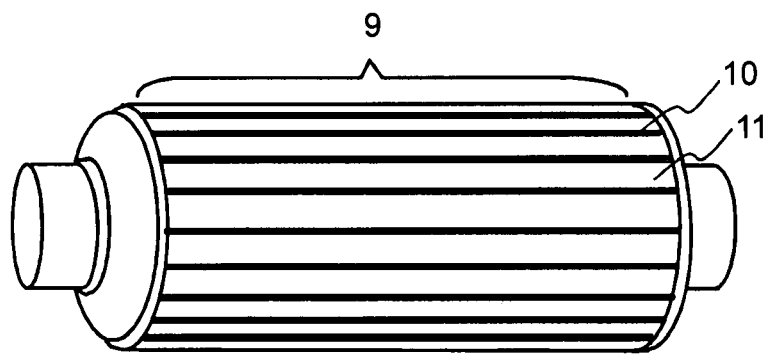
FIG. 4 shows a perspective view of another coiler drum.

In FIG. 4 is presented a coiler drum having raised strips 10. The raised strips 10 are formed to the outer surface i.e. the base surface 11 of the coiler drum body. When winding the metal strip 4 on to the coiler drum 5, the base surface 11 will not be in contact with the metal strip 4, but it is engaged by the raised surfaces of the raised strips 10. These raised surfaces form the working surface 9 of the strips that will engage the strip of metal.

Figure 5:
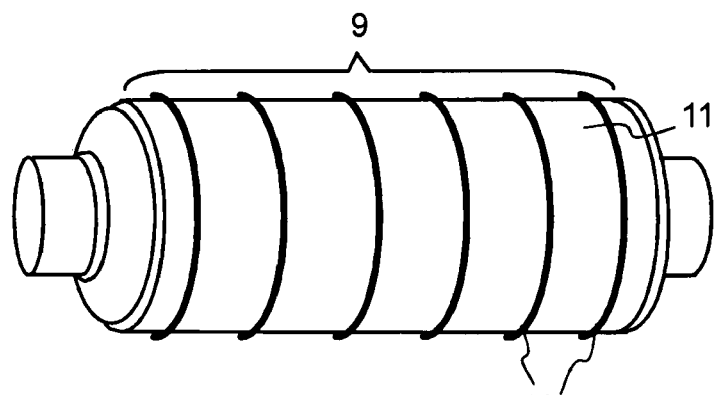
FIG. 5 shows a perspective view of a third coiler drum.
Figure 6A:
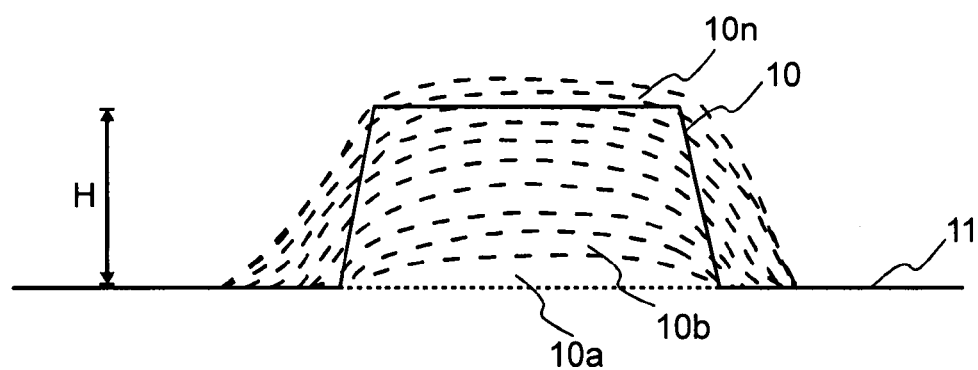
FIGS. 6a and 6b show a cross sectional views of a strip on the coiler drum.
Figure 6B:
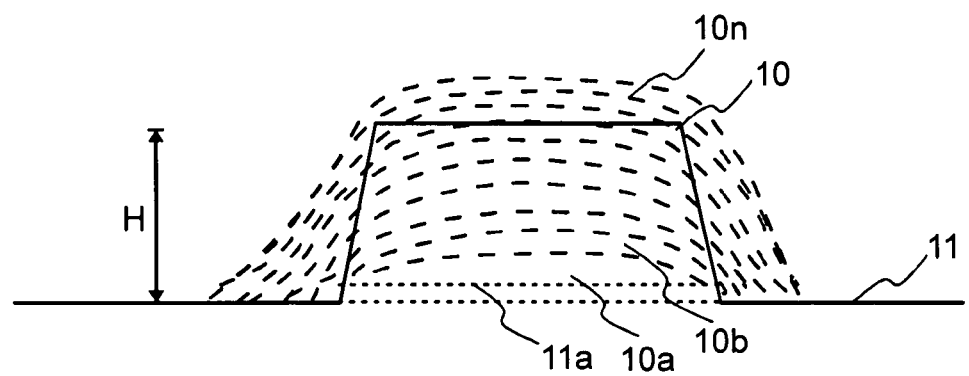

The orientation of the raised strips 10 on the base surface 11 relative to the coiler drum may vary. In the embodiment shown in FIG. 4, the raised strips 10 are substantially parallel to the longitudinal axis of the coiler drum 5. The length of the raised strips 10 extends to the entire length of the base surface 11. The raised strips 10 are arranged around the circumference of the base surface 11 at regular intervals from each other. The raised strips 10 may also be arranged to have variable spacing on the base surface 11. Also the length and frequency of the raised strips 10 may vary. They may extend only to a portion of the axial length of the base surface. The raised strips 10 of shorter length can also be laterally offset or staggered across the base surface 11. Also, certain cross sections of the base surface 11 may not include any raised strips 10. In the embodiment shown in FIG. 5 the raised strips 10 are circumferentially oriented relative to the longitudinal axis of the coiler drum 5. In this embodiment, the raised strips 10 are formed as circumferentially continuous separate rings around the coiler drum 5. The circumferential raised strips 10 may also consist of separate staggered segments of a ring. There may also be only one raised strip 10 that is arranged as a helix around the base surface 11. The raised strips 10 are produced on the base surface by overlay welding. The strip is formed by overlaying several weld beads 10a-10n on top of another. In FIGS. 6a and 6b this is presented in more detail. The strips can be finished by machining and/or grinding to have a suitable height H and shape. In the finishing, it is possible only to treat the weld beads of the strips 10. This is shown in FIG. 6a. The machining and/or grinding has been done in such a way that it only affects the weld beads 10a-10n to form a desired shape and height strip 10. The base surface 11 retains as it was before finishing. It is also possible to extend the machining to the base surface 11. When doing this, both the base surface and upper surfaces of the strips are treated. This is shown in FIG. 6b. The machining and/or grinding has been done in such a way that also material from the base surface has been removed. The base surface 11 around the finished strip 10 is below the original base surface 11a, because the base surface of the coiler drum has also been machined.

The height H of the raised strips is about 2 to about 10 mm, suitably from about 4 to about 8 mm. The raised strips 10 have a flat upper surface. When winding the metal strip 4 on the coiler drum 5, the upper surfaces of the raised strips 10 form the working surface 9 that will engage the strip of metal when it is being processed in a reversing rolling mill.

The trinickel aluminide alloy consists of, in % by weight,
4.0 to 12.0% Al
0 to 16.0% Cr
0 to 1.5% Mo
0 to 1.5% Zr
0 to 0.003% B the balance being Ni and inevitable impurities. The alloy has a metal structure comprising $Ni_3Al$ as the main phase thereof.

The coiler drums that are manufactured according to the invention are especially suitable for use in Steckel Mill coiler furnaces.

The intention is not to restrict the invention to the embodiments described by way of example, but it is intended that the invention can be interpreted widely within the scope of protection defined by the claims presented hereinbelow.

The invention claimed is:

1. A method for manufacturing a coiler drum to be used in a coiler furnace, the coiler drum comprising a coiler drum body, the method comprising:
   casting the coiler drum body;
   forming an outer working surface layer comprising a trinickel aluminide alloy on to the coiler drum body;
   forming the outer working surface layer as raised strips onto a base surface of the coiler drum body; and
   finishing upper surfaces of the strips and the base surface of the coiler drum body around the strips.

2. The method according to claim 1, further comprising:
   forming the surface layer onto the coiler drum body by welding.

3. The method according to claim 1, further comprising:
   forming the surface layer onto the coiler drum body by plasma welding.

4. The method according to claim 1, further comprising:
   forming the surface layer onto the coiler drum body by laser welding.

5. The method according to claim 1, further comprising:
   forming the surface layer onto the coiler drum body by MIG/MAG or TIG-welding.

6. The method according to claim 1, further comprising:
   forming the surface layer onto the coiler drum body by thermal spraying.

7. The method according to claim 1, further comprising:
   forming the surface layer by superimposing several layers of trinickel aluminide alloy on the coiler drum body.

8. The method according to claim 1, further comprising:
   forming the surface layer on to the coiler drum body in such a way that the surface layer extends in the axial direction of the coiler drum from one end of the coiler drum to the other and covers the coiler drum body around its entire circumference, the surface layer defining working surface engaging a strip of metal when it is being rolled on the coiler drum.

9. The method according to claim 1, further comprising:
   forming the surface layer onto the coiler drum body by arranging a sleeve of trinickel aluminide alloy onto the coiler drum body.

10. The method according to claim 1, further comprising:
    forming the surface layer as raised strips onto the coiler drum body, the raised strips extending radially outward from the coiler drum body.

11. The method according to claim 10, further comprising:
    forming the raised strips on the coiler drum body by overlaying weld beads on top of another.

12. The method according to claim 11, further comprising:
    forming the surface layer onto the coiler drum body by plasma welding.

13. The method according to claim 11, further comprising:
    forming the surface layer onto the coiler drum body by laser welding.

14. The method according to claim 11, further comprising:
    forming the surface layer onto the coiler drum body by MIG/MAG or TIG-welding.

15. The method according to claim 10, further comprising:
    finishing the raised strips are by machining and/or grinding.

16. The method according to claim 10, wherein the raised strips define a working surface that will engage a strip of metal when it is being rolled on the coiler drum.

17. The method according to claim 1, wherein the chemical composition of the trinickel aluminide alloy is, presented in weight-%:
    4.0 to 12.0% Al
    0 to 16.0% Cr
    0 to 1.5% Mo
    0 to 1.5% Zr
    0 to 0.003% B
    the balance being Ni and inevitable impurities.

18. A coiler drum for use in a coiler furnace, comprising:
    a cast coiler drum body, and
    an outer working surface layer on an original base surface of the cast coiler drum body, the outer working surface layer comprising raised strips and trinickel aluminide alloy,
    wherein a finished base surface around the strips is below the original based surface of the cast coiler drum body.

19. The coiler drum according to claim 18, wherein the surface layer is formed onto the coiler drum body by welding.

20. The coiler drum according to claim 18, wherein the surface layer is formed onto the coiler drum body by plasma welding.

21. The coiler drum according to claim 18, wherein the surface layer is formed onto the coiler drum body by laser welding.

22. The coiler drum according to claim 18, wherein the surface layer is formed onto the coiler drum body by MIG/MAG or TIG-welding.

23. The coiler drum according to claim 18, wherein the surface layer is formed onto the coiler drum body by thermal spraying.

24. The coiler drum according to claim 18, wherein the surface layer comprises several layers of trinickel aluminide alloy superimposed onto the coiler drum body.

25. The coiler drum according to claim 18, wherein the surface layer extends in the axial direction of the coiler drum from one end of the coiler drum to the other and covers the coiler drum body around its entire circumference, and defines a working surface that will engage a strip of metal when it is being rolled on the coiler drum.

26. The coiler drum according to claim 18, wherein the surface layer is formed onto the coiler drum body by arranging a sleeve of trinickel aluminide alloy onto the coiler drum body.

27. The coiler drum according to claim 18, wherein the surface layer comprises raised strips on the coiler drum body, the raised strips extending radially outward from the coiler drum body.

28. The coiler drum according to claim 27, wherein the raised strips comprise overlaid weld beads on top of another.

29. The coiler drum according to claim 28, wherein the surface layer is formed onto the coiler drum body by plasma welding.

30. The coiler drum according to claim 28, wherein the surface layer is formed onto the coiler drum body by laser welding.

31. The coiler drum according to claim 28, wherein the surface layer is formed onto the coiler drum body by MIG/MAG or TIG-welding.

32. The coiler drum according to claim 27, wherein the raised strips are finished by machining and/or grinding.

33. The coiler drum according to claim 27, wherein the raised strips define a working surface that will engage a strip of metal when it is being rolled on the coiler drum.

34. The coiler drum according to claim 18, wherein the chemical composition of the trinickel aluminide alloy is, presented in weight-%:
4.0 to 12.0% Al
0 to 16.0% Cr
0 to 1.5% Mo
0 to 1.5% Zr
0 to 0.003% B
the balance being Ni and inevitable impurities.

\* \* \* \* \*